US009542407B2

(12) United States Patent
Hombert

(10) Patent No.: US 9,542,407 B2
(45) Date of Patent: Jan. 10, 2017

(54) METHOD AND APPARATUS FOR MEDIA SEARCHING USING A GRAPHICAL USER INTERFACE

(71) Applicant: BlackBerry Limited, Waterloo (CA)

(72) Inventor: Jonas Hombert, Stockholm (SE)

(73) Assignee: BlackBerry Limited, Waterloo, Ontario (CA)

( * ) Notice: Subject to any disclaimer, the term of this patent is extended or adjusted under 35 U.S.C. 154(b) by 179 days.

(21) Appl. No.: 14/040,908

(22) Filed: Sep. 30, 2013

(65) Prior Publication Data
US 2015/0095839 A1    Apr. 2, 2015

(51) Int. Cl.
*G06F 3/0482* (2013.01)
*G06F 3/0488* (2013.01)
*G06F 17/30* (2006.01)
*G11B 27/34* (2006.01)

(52) U.S. Cl.
CPC ....... *G06F 17/30126* (2013.01); *G06F 3/0482* (2013.01); *G06F 3/0488* (2013.01); *G06F 17/30846* (2013.01); *G06F 17/30849* (2013.01); *G06F 17/30852* (2013.01); *G11B 27/34* (2013.01)

(58) Field of Classification Search
CPC .............. G06F 17/30849; G06F 17/30846; G06F 17/30852; G06F 17/30; G06F 3/0488; G06F 3/0482
See application file for complete search history.

(56) References Cited

U.S. PATENT DOCUMENTS

| 5,237,648 A | 8/1993 | Mills et al. |
| 5,513,306 A | 4/1996 | Mills et al. |
| 5,732,184 A | 3/1998 | Chao et al. |
| 5,880,722 A | 3/1999 | Brewer et al. |
| 5,999,173 A | 12/1999 | Ubillos |
| 7,073,127 B2 | 7/2006 | Zhao et al. |
| 7,165,227 B2 | 1/2007 | Ubillos |

(Continued)

FOREIGN PATENT DOCUMENTS

EP     2395440     12/2011

OTHER PUBLICATIONS

European Search Report dated Mar. 18, 2015 for European Application No. 14186969.3.

*Primary Examiner* — William Bashore
*Assistant Examiner* — Daniel Parcher
(74) *Attorney, Agent, or Firm* — Thomas S. Grzesik; Fleit Gibbons Gutman Bongini & Bianco P.L.

(57) ABSTRACT

The present disclosure provides for a method and an apparatus that enables a collection of media files to be rapidly searched for segments or sub-segments of media content. A graphical user interface is rendered on a display under control of a processor. The interface includes a file-view window configured to display representative images of the media files. In one mode of operation, the processor displays representative images of segments of a selected media file an expanded-view window in response to a sensed user input on the representative image of the media file. A segment may be further expanded or selected for processing in response to a sensed user input on the representative image of the segment in the expanded-view window. Expansion, contraction and selection of a media file, or segments of the media file, are provided.

28 Claims, 8 Drawing Sheets

(56) References Cited

U.S. PATENT DOCUMENTS

| | | |
|---|---|---|
| 7,359,617 B2 | 4/2008 | Ma |
| 7,398,002 B2 | 7/2008 | Hsiao et al. |
| 7,434,155 B2 | 10/2008 | Lee |
| 7,877,690 B2 | 1/2011 | Margulis |
| 8,020,100 B2 | 9/2011 | Ubillos et al. |
| 8,156,176 B2 | 4/2012 | Lerman et al. |
| 8,224,159 B2 * | 7/2012 | Hirose et al. ............... 386/280 |
| 8,254,671 B1 | 8/2012 | Roth et al. |
| 8,276,074 B2 | 9/2012 | Ubillos |
| 8,407,596 B2 | 3/2013 | Yu et al. |
| 8,458,595 B1 | 6/2013 | Margulis |
| 2002/0059584 A1 * | 5/2002 | Ferman et al. ............... 725/34 |
| 2002/0154177 A1 * | 10/2002 | Barksdale ......... G06F 17/30126 715/853 |
| 2004/0125124 A1 * | 7/2004 | Kim et al. ................. 345/716 |
| 2007/0203942 A1 * | 8/2007 | Hua et al. ................ 707/104.1 |
| 2008/0059909 A1 | 3/2008 | Parada et al. |
| 2008/0256450 A1 * | 10/2008 | Takakura et al. ........... 715/721 |
| 2009/0002335 A1 | 1/2009 | Chaudhri |
| 2009/0113350 A1 * | 4/2009 | Hibino ............ G06F 17/30061 715/853 |
| 2010/0088641 A1 | 4/2010 | Choi |
| 2010/0283743 A1 | 11/2010 | Coddington |
| 2011/0164042 A1 | 7/2011 | Chaudhri |
| 2012/0030635 A1 * | 2/2012 | Miyazaki ............. G06F 3/0482 715/863 |
| 2013/0307792 A1 * | 11/2013 | Andres ............... G11B 27/005 345/173 |
| 2014/0029915 A1 * | 1/2014 | Lin ......................... H04N 5/91 386/241 |
| 2014/0298268 A1 * | 10/2014 | Kang et al. ................. 715/841 |

* cited by examiner

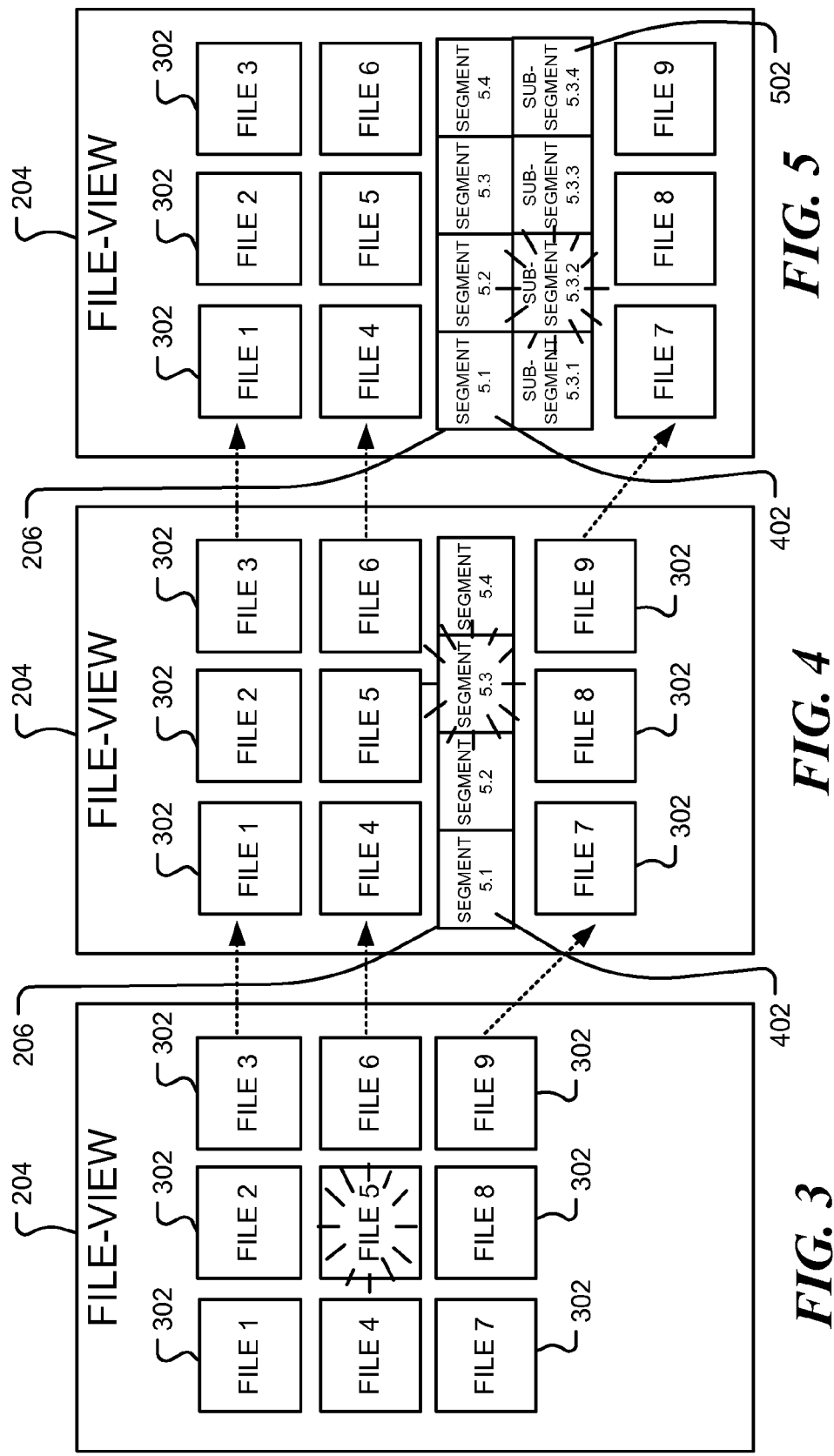

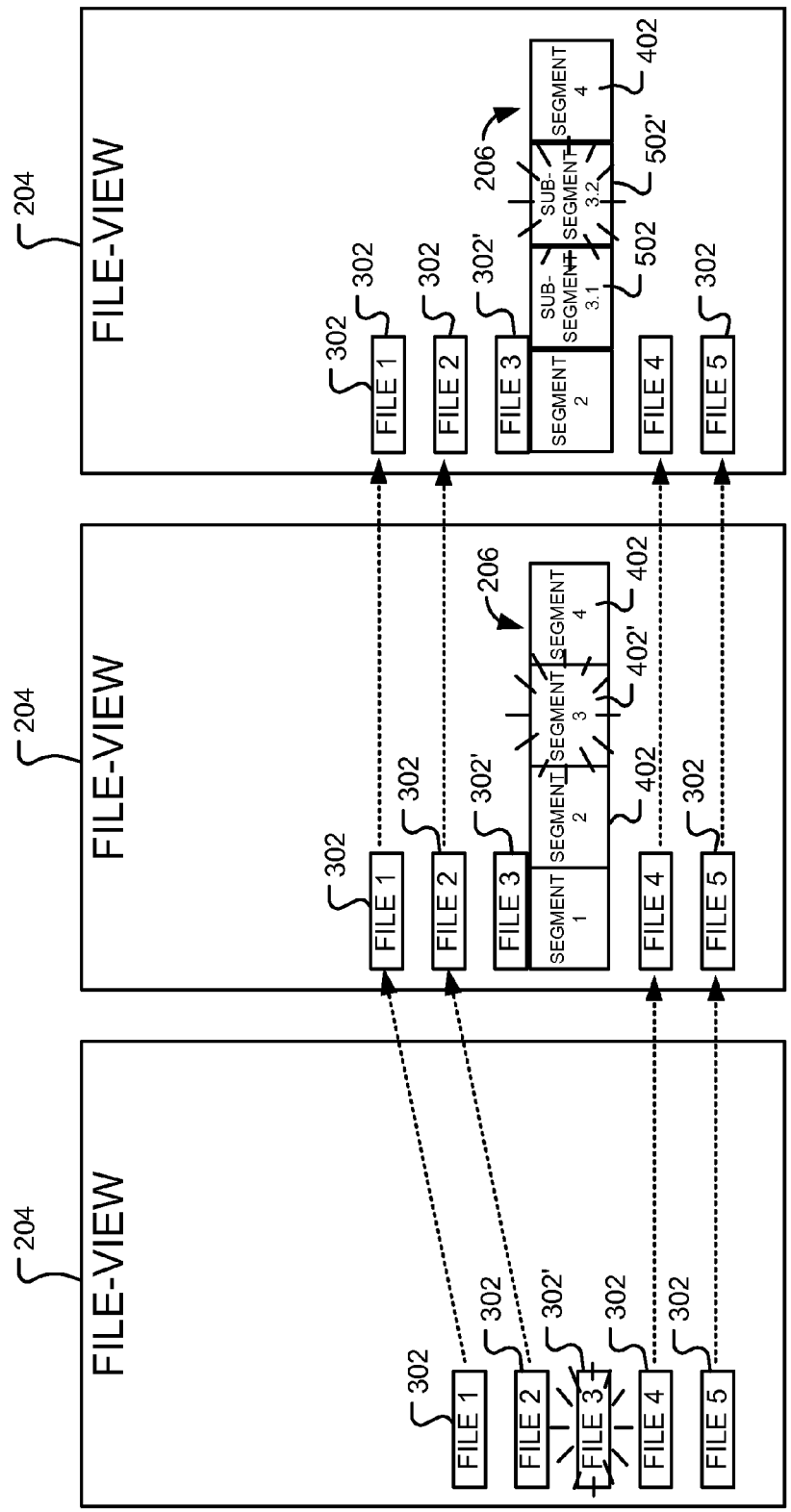

METHOD AND APPARATUS FOR MEDIA SEARCHING USING A GRAPHICAL USER INTERFACE

BACKGROUND

Portable electronic devices such as tablet computers, smart phones, personal digital assistants (PDA's), portable media players and the like, often have relatively small displays screens to make them more portable. This limits the number and size of graphical display elements that can be displayed at any one time on the display screen. As a consequence, user interfaces must be simplified.

Consider, for instance, a user interface for the selection of videos for display from a collection of videos. One approach is to display representative frames, or "thumbnails," of available videos and then select a video of the available videos in response to a user's touch on a displayed thumbnail. However, this action causes the video to be played from the start and does not allow selection of a portion of the video, such as a favorite scene. To access a desired scene, a user must then interact with a displayed scroll bar or a scrubber bar to search through the video. This approach may be very inefficient for longer videos.

In video editing on a larger screen, a single video may be split in multiple segments and thumbnails from each segment displayed in one or more rows, together with scroll bars to enable selection of a segment for editing. However, on a small screen, the scroll bars may be too small for easy manipulation, or, if enlarged, leave little screen space for additional information to be displayed. This problem is exacerbated when the graphical user interface is displayed on a touch-sensitive screen and is controlled by a touch of a user's fingertip rather than by a computer mouse.

It would be useful to provide a way to easily select a segment of video or other media from a plurality of media files displayed for selection on a display screen of an electronic device.

BRIEF DESCRIPTION OF THE DRAWINGS

Exemplary embodiments of the present disclosure will be described below with reference to the included drawings such that like reference numerals refer to like elements and in which:

FIGS. 3-5 are diagrammatic representations of a sequence of views of a graphical user interface, in accordance with exemplary embodiments of the disclosure;

FIGS. 6-8 are diagrammatic representations of a sequence of views of a graphical user interface, in accordance with exemplary embodiments of the disclosure;

DETAILED DESCRIPTION

Figure 1:
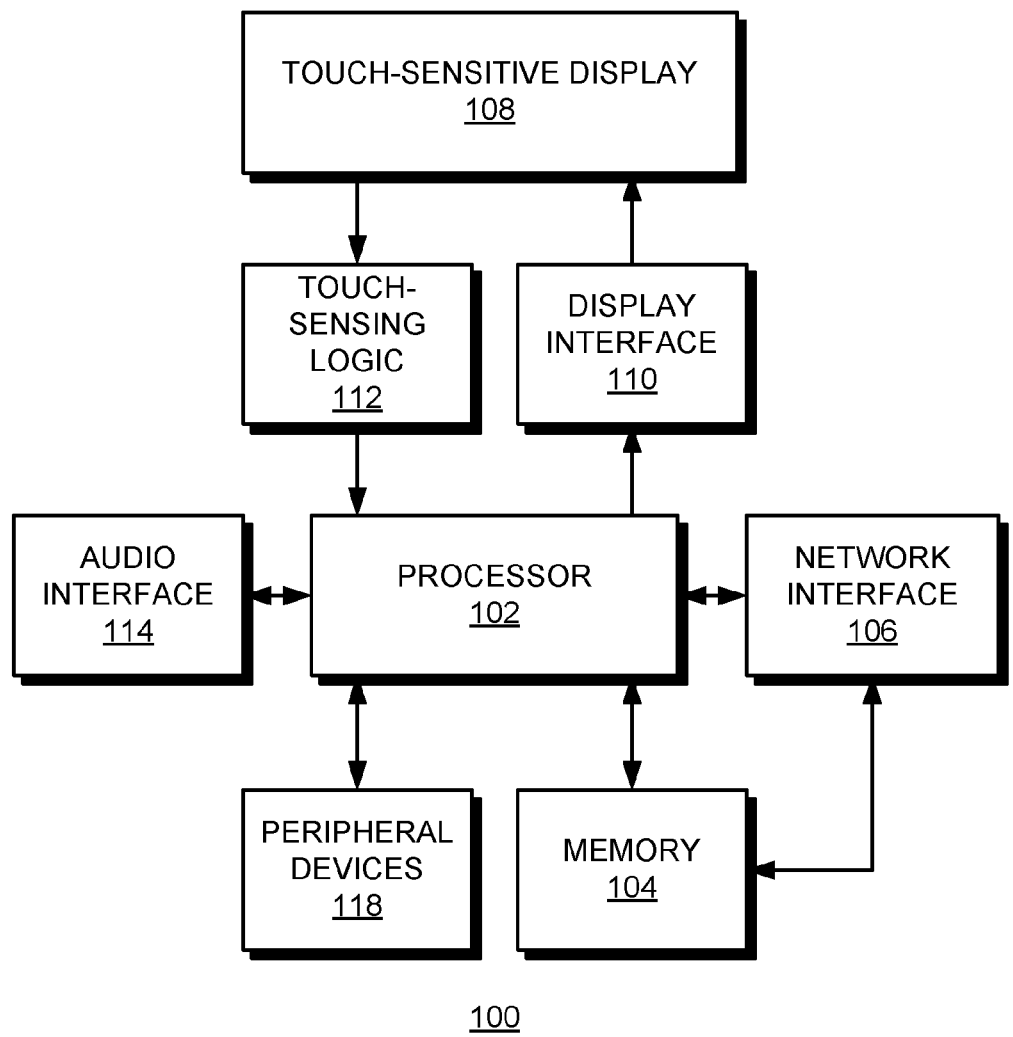
FIG. 1 is a block diagram of a communications system, in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

The present disclosure relates to an apparatus and method for selecting a segment of a media file to be processed on an electronic device. The method may be implemented on a portable or handheld electronic device such as a tablet computer, smart phone, personal digital assistant (PDA), portable media player and the like. However, the method may also be used on other devices having larger screens, such as desktop computers, laptop computers and the like. The method may be implemented in standalone software, such as a media player application or a video editing application, for instance, or implemented as part of a more general application, such as a browser for viewing pages from the World Wide Web and accessing remote content via the Internet, for example.

The disclosed method and apparatus enables a collection of media files to be rapidly searched and for segments (or sub-segments, etc.) within the media files to be selected for processing. Any form of subsequent processing may be applied, including display, playback, editing, transmission to another location or device, storing in memory, etc.

The media files may be, for example, video files having graphical content in the form of a sequence of image frames. However, the approach may be used for other media files containing sequences of images or graphical content, such as computer animations and slide presentations.

The media files contain a digital representation of the content. The representation may be retrieved and interpreted by a processor of an electronic device. For example, many media representations are compressed by encoding to reduce file size, and must be decompressed before they can be accessed for playback, display or other processing.

In an exemplary embodiment, an electronic device includes a display, a processor coupled to the display and a memory coupled to, and in cooperative arrangement, with the processor. The processor and memory are configured to generate a graphical user interface on the display. The graphical user interface has a file-view window configured to display representative images of media files. In response to a user input on a representative image of a media file in the file-view window, representative images of segments of the media file are rendered in an expanded-view window on the display. In response to a user input on one of the representative images of segments of the media file in the expanded-view window, the corresponding segment of the media file is selected for processing. A characteristic of the user input on the representative image of the media file may be sensed to differentiate between different user inputs. If the user input has a first characteristic, the media file is selected to be displayed in the expanded-view window, otherwise the complete media file is selected for processing.

Thus, a segment of a media file may be selected for processing by displaying representative images of media files in a file-view window of a graphical user interface and determining a characteristic of a user input on a representative image in the file-view window. If the determined characteristic of the user input is associated with an expansion operation, representative images of a number of segments of the media content associated with the representative image in the file-view window are displayed in an expanded-view window of the graphical user interface. In response to a user input on a representative image of a segment of a media file displayed in the expanded-view window, a characteristic of the user input is determined. If the determined characteristic of the user input is associated with a selection operation, the media content associated with the representative image associated with the user input is selected for processing.

The display may be a touch-sensitive display and a segment of a media file may be selected for processing by displaying a graphical user interface having file-view window on the touch-sensitive display and displaying representative images of a plurality of media files in the file-view window. In response to a user touch action associated with an expansion operation on a representative image of a media file in the file-view window, representative images of a plurality of segments of media content associated with the touched representative image in the file-view window are displayed in an expanded-view window of the graphical user interface. In response to a user touch action associated with a selection operation on a representative image of segment of a media file displayed in the expanded-view window, the segment of media content associated with the touched representative image is selected for processing.

FIG. 1 is a block diagram of an electronic device in accordance with exemplary embodiments of the disclosure. The device 100 includes a processor 102 operable to retrieve media files from a memory 104. The memory 104 may be a non-transitory memory used to store the media files or a transitory memory used to buffer information retrieved from a remote location via a network interface 106 or other connection. The device 100 also includes a display 108. In this illustrative embodiment, the display 108 comprises a touch sensitive display screen that is coupled to the processor 102 via a display interface 110 and touch sensing logic 112. However, other displays may be used. User input may be provided by a pointing device such as a computer mouse, a joystick, a touch pad, a stylus or a finger, for example. The coupling between the device 100 and processor 102 may be wired or wireless. The device 100 also includes an audio interface 114, for playback of audio content and, optionally, for receipt of audio input. Other peripheral devices 118 may also be provided, along with standard components such as a clock, a power supply, data ports and the like.

Exemplary embodiments utilizing touch-sensitive displays will be described. However, other types of displays and pointing devices may be used to provide a graphical user interface. Similarly, user input may be provided by sensing user touch actions on touch-sensitive display, or by receiving inputs from a pointing device as described above.

Figure 2A:
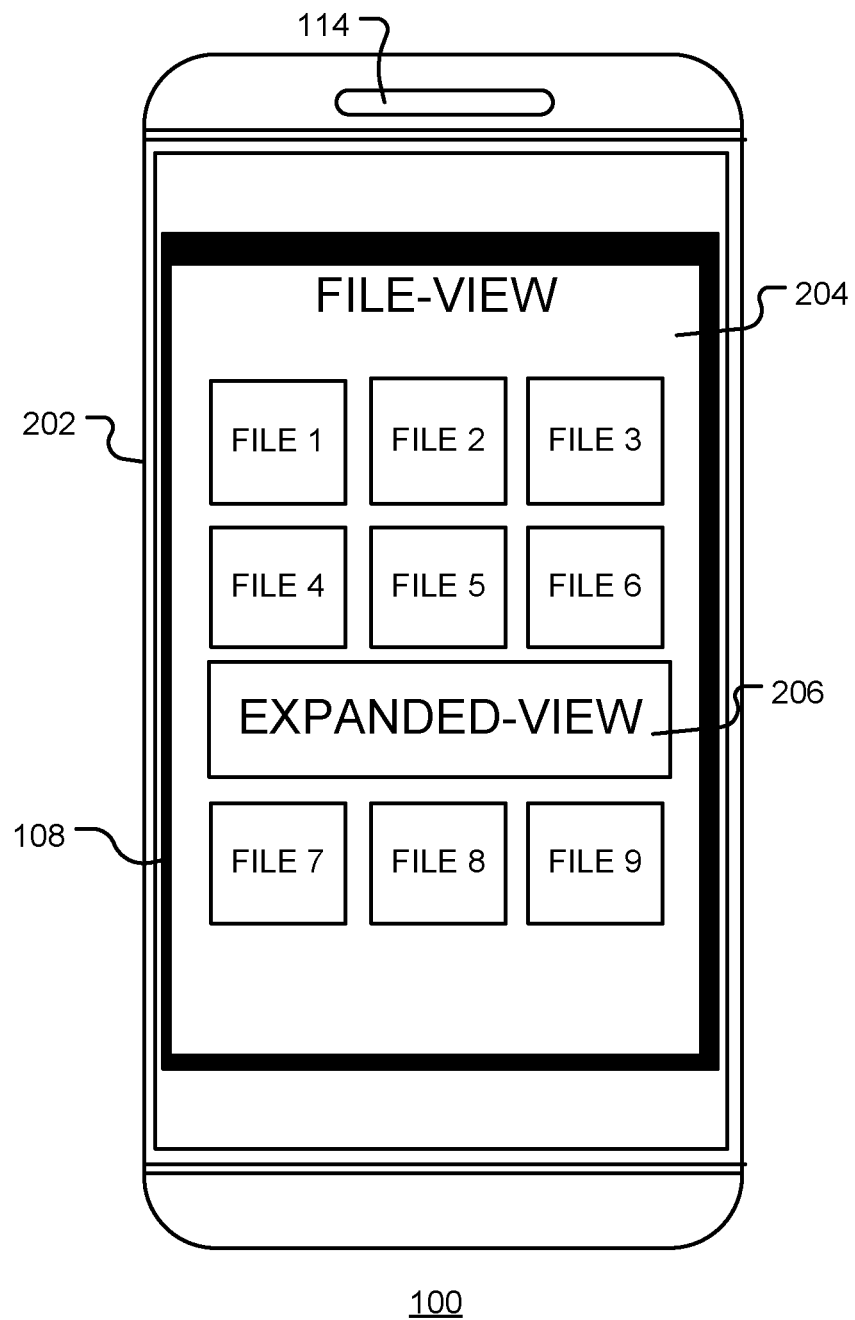
FIGS. 2A and 2B are diagrammatic representations of a device in accordance with exemplary embodiments of the disclosure.

FIG. 2A is a diagrammatic representation of a device 100 in accordance with exemplary embodiments of the disclosure. The device 100 includes a case or housing 202 that supports touch-sensitive display 108, audio interface 114 and other components described above. The touch-sensitive screen 108 is operable to display a graphical user interface that includes a file-view window 204, configured to display representative images of media files, and an expanded-view window 206, configured to display representative images of segments of a selected media file. Other user controls may also be displayed on the screen 108. While shown with the file-view window 204 containing the expanded-view window 206, it will be apparent that other views may be chosen. For example, the windows could be arranged vertically or the expanded-view window 206 could be positioned below the file-view window 204.

Figure 2B:
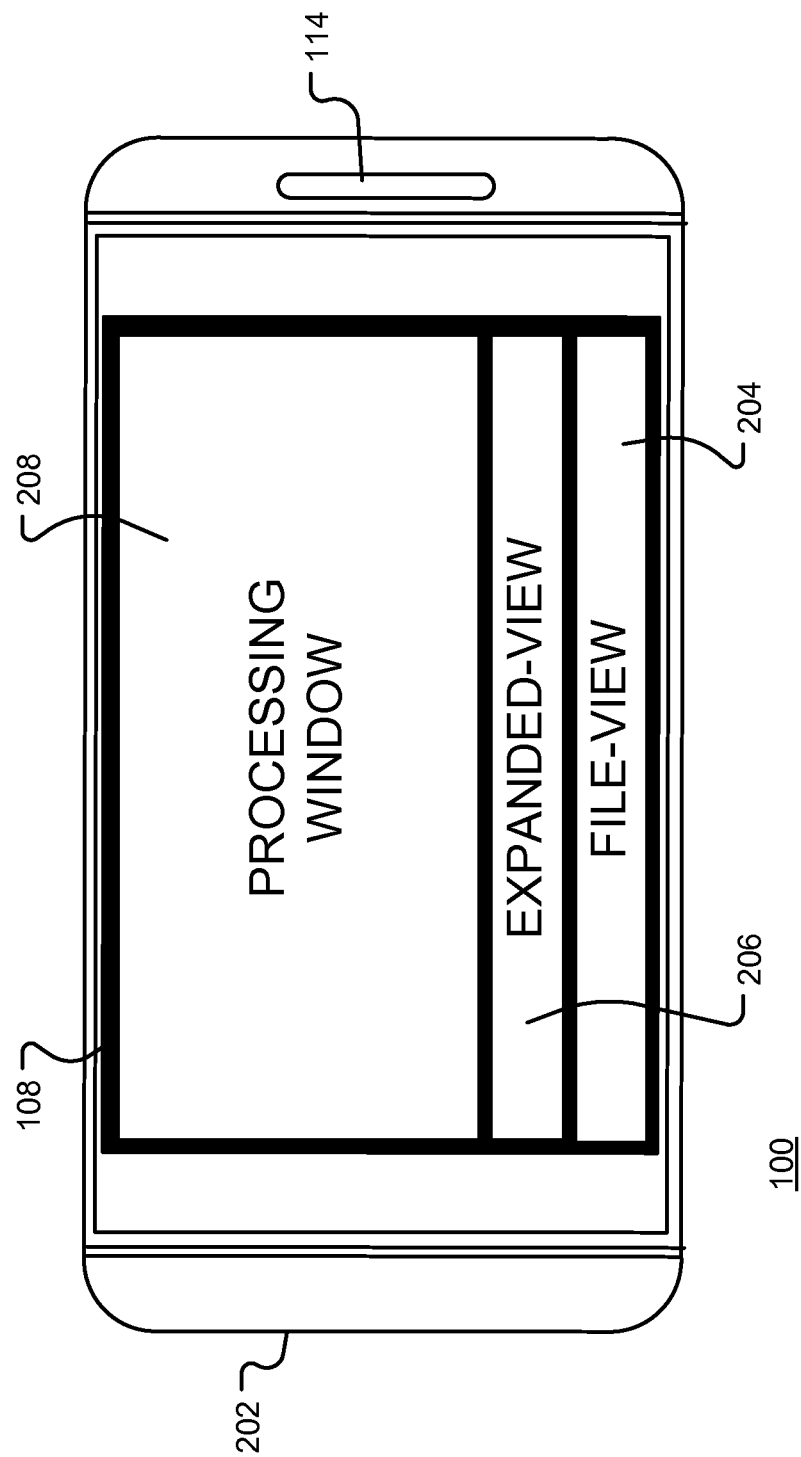

In FIG. 2A, the device 100 is orientated in a vertical or portrait mode; however, the device may alternatively be operated in a horizontal or landscape mode, as shown in FIG. 2B. The graphical user interface may also include other elements, such as a processing window 208 shown in FIG. 2B. The processing window may be used, for example, for displaying video segments or still images, video editing, or other processing operations.

FIG. 3 is a diagrammatic representation of a file-view window 204 of a graphical user interface, in accordance with exemplary embodiments of the disclosure. Representative images 302, such as thumbnail images, of a number of media files (denoted as "FILE 1", "FILE 2", etc.) are displayed in the file-view window 204. In the embodiment shown, nine representative images are displayed but a different number of images could be shown. Additional or alternative images may be shown by scrolling the window using a vertical or horizontal swipe or scroll buttons, for example. In accordance with an aspect of the disclosure, the processor is configured to distinguish between at least two types of user touch actions. The user touch actions may be, for example, a single tap, a double tap, a short duration tap, a longer duration tap and hold, a swipe in one or more directions or combinations thereof. User touch actions are assigned to desired operations and are recognized by the processor. For example, user touch actions may be assigned to 'selection', 'expansion', and 'contraction' operations. Additionally, user touch actions may be interpreted dependent upon a current context, as described below. For example the same action may be interpreted as 'contract' if a file is already expanded and as 'expand' if it is not. In each case, a user touch is sensed and its character is identified as a user touch action. An 'expand' user touch action on image representative of "FILE 5" causes an expanded view window 206 to be displayed, as illustrated in FIG. 4. Referring to FIG. 4, an expanded view window contains a number of images 402 representative of segments of the selected file. Each of the representative images 402 corresponds to a segment or portion of the media content of "FILE 5". The segments may be chosen, for example, by splitting the content into a number segments of substantially equal length or by identifying logical breaks in the content, such as scene or shot changes in a video file, or volume or rhythm changes in a music file. For example, a scene change may be detected as a jump in the size of a compressed video frame. Once the segments 402 are displayed, a particular segment may be selected for processing by the appropriate user touch action. For example, the representative image 402 may comprise a thumbnail image of a frame from a video segment, and the selection action may be used to cause the video segment to be played.

In an illustrative embodiment where user input is provided by a pointing device, user input characteristics such 'single click' and 'double click' may be used, for example, to differentiate between selection actions and expansion actions.

The segments 402 may be removed from the expanded-view window 206 by a further user touch action on the "FILE 5" representative image or by a user tap on a representative image 302 other than the "FILE 5" image. In this way, the content of the media files may be conveniently and rapidly searched and selected by a user.

The segments 402 may be further expanded, as shown in FIG. 5. FIG. 5 is a further diagrammatic representation of a file-view window 204 and an expanded-view window 206 of a graphical user interface, in accordance with exemplary embodiments of the disclosure. A segment may be further expanded by tapping the representative image of the segment. In the view shown in FIG. 5, a user tap (as shown in FIG. 4) has been sensed on the representative image of segment 5.3 (the third segment of "FILE 5"). The processor responds by splitting segment 5.3 into a number of sub-segments 502. As before, the sub-segments may be determined in various ways without departing from the present disclosure. Representative images 502 of sub-segments of segment 5.3 are displayed in the expanded-view window 206. The images 502 may be displayed below the segment images, as shown. A sub-segment 5.3.2, for example, may be selected for processing by an appropriate user touch action as indicated in the figure. The sub-segments 502 may be removed, for example, by tapping on the "FILE 5" image 302' in the file-view window 204. This contracts the view to that shown in FIG. 4. A further tap would remove the displayed segments. This process of expansion and contraction of segments may be continued to display sub-sub-segments etc. Again, other user touch actions may be used to distinguish between expansion, contraction and selection without departing from the present disclosure.

A further exemplary embodiment is shown in FIGS. 6, 7 and 8. FIGS. 6 and 7 correspond to FIGS. 3 and 4 discussed above, except that a column of file images is displayed rather than an array of file images. Again, an 'expand' user touch action on segment 3 in FIG. 7, causes segment 402' to be replaced in the expanded view window by a number of sub-segments 502 as shown in FIG. 8. While only 2 sub-segments are shown in the figure, any number of sub-segments may be inserted. This enables a user to easily and rapidly search for a section of media file. Once found, the section may be selected for processing, such as display, playback, editing, etc.

Figure 9:
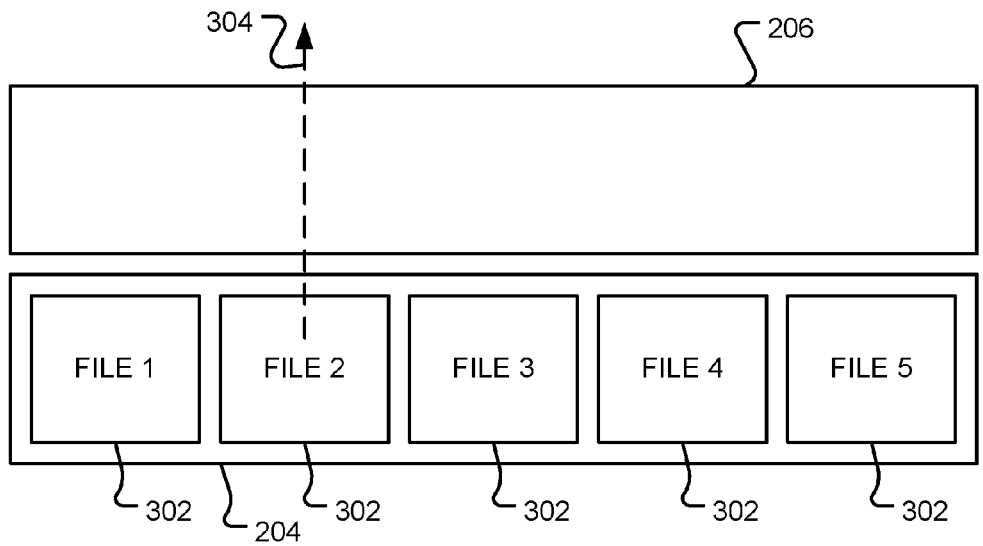
FIG. 9 is a diagrammatic representation of a file-view window and an expanded-view window of a graphical user interface, in accordance with exemplary embodiments of the disclosure.

FIG. 9 is a diagrammatic representation of a file-view window 204 and an expanded-view window 206 of a graphical user interface, in accordance with exemplary embodiments of the disclosure. The file-view window may be displayed at the bottom of screen orientated in portrait or landscape mode. Representative images 302, such as thumbnail images, of a number of media files (denoted as "FILE 1", "FILE 2", etc.) are displayed in the file-view window 204. In the embodiment shown, five thumbnail images are displayed but a different number of images could be shown. Additional or alternative images may be shown by scrolling the window. This may be done by a horizontal swipe across the window 204, or by other scrolling means. In the embodiment described here, a tap and a swipe towards a processing window (an upward swipe in the example presented) are used, but it will be apparent to those of ordinary skill in the art that user touch actions having other touch characteristics may be used. Referring again to FIG. 9, a media file ("FILE 2") is selected for processing by a user touch that begins on the representative image 302 and moves upward as indicated by the arrow 304. For example, the representative image 302 may comprise a thumbnail image of a frame from a video, and the upward moving user touch or swipe, indicated by the arrow 304, may be used to cause the video to be played from the beginning or played from a previous position.

Figure 10:
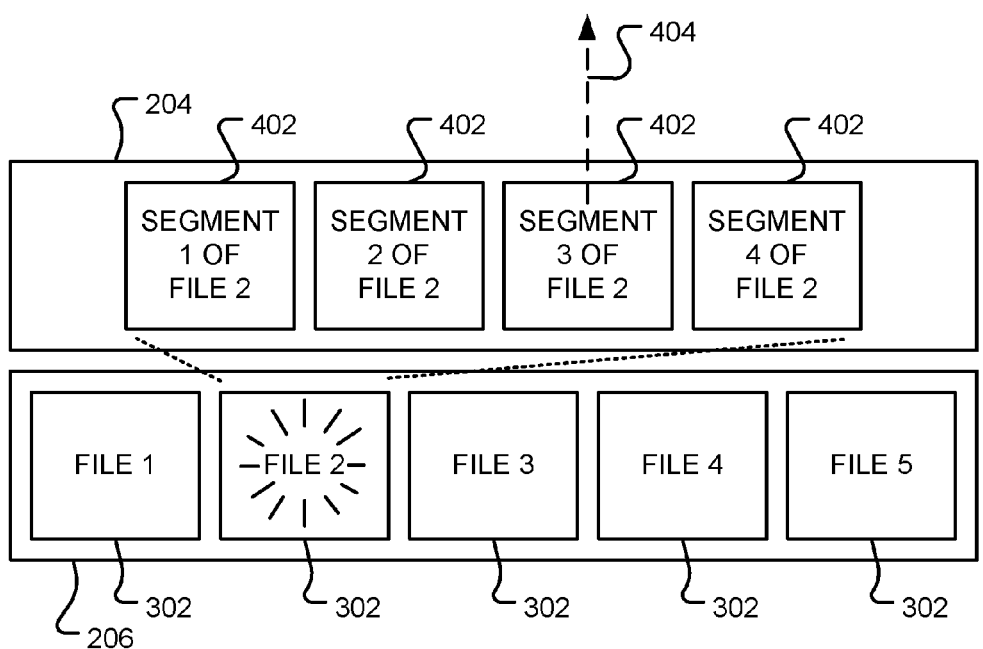
FIG. 10 is a further diagrammatic representation of a file-view window and an expanded-view window of a graphical user interface, in accordance with exemplary embodiments of the disclosure.

However, a user may wish to select only a segment or portion of the media content. In this case, as depicted in FIG. 10, the user taps the representative image 302 of the media file "FILE 2", and a number of additional representative images 402 are displayed in expanded-view window 206. Again, in other embodiments a user touch action other than a tap may be associated with 'expansion'. Each of the representative images 402 corresponds to a segment or portion of the media content of "FILE 2". The segments may be selected, for example, by splitting the content into a number segments of substantially equal length or by identifying logical breaks in the content, such as scene or shot changes in a video file, or volume or rhythm changes in a music file. For example, a scene change may be detected as a jump in the size of a compressed video frame. Once the segments 402 are displayed, a particular segment may be selected for processing by a user touch that begins on a representative image 402 and moves upward as indicated by the arrow 404. For example, the representative image 402 may comprise a thumbnail image of a frame from a video segment, and the upward moving user touch, indicated by the arrow 304, may be used to cause the video segment to be played. In the example shown, segment 3 of "FILE 2" is selected for processing. In this way, the first two segments of the media content of "FILE 2" are skipped, enabling a user to more easily move to a desired portion of the media content.

The segments 402 may be removed from the expanded-view window 204 by a further user tap on the "FILE 2" representative image 302. Alternatively, the segments 402 may be replaced in the expanded-view window 204 by a user tap on a representative image 302 other than the "FILE 2" image. In this way, the content of the media files may be conveniently and rapidly searched and selected by a user.

Figure 11:
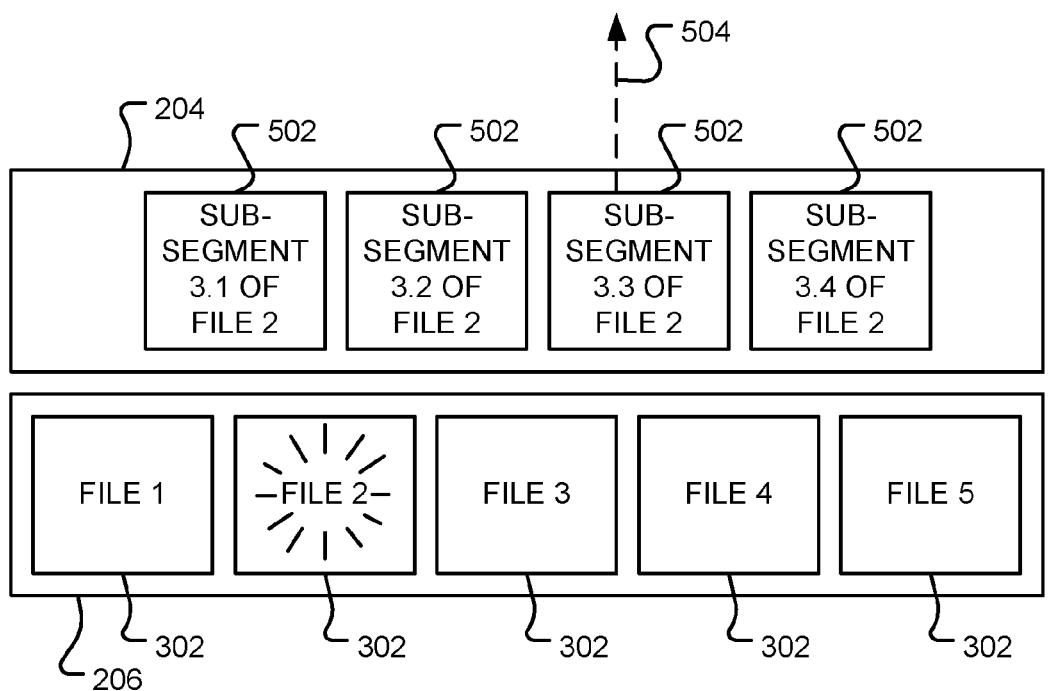
FIG. 11 is a still further diagrammatic representation of a file-view window and an expanded-view window of a graphical user interface, in accordance with exemplary embodiments of the disclosure.

FIG. 11 is a further diagrammatic representation of a file-view window 204 and an expanded-view window 206 of a graphical user interface, in accordance with exemplary embodiments of the disclosure. Once an expanded view of a selected media file 302 is displayed in the expanded-view window 206, a segment may be selected for processing, as described above, with an upward swipe or other assigned user touch action. Alternatively, a segment may be further expanded by tapping the representative image of the segment. In the view shown in FIG. 11, a user tap has been sensed on the representative image of segment 3 of "FILE 2" (as shown in FIG. 10). The processor responds by splitting segment 3 of "FILE 2" into a number of sub-segments. As before, the sub-segments may be determined in various ways without departing from the present disclosure. Representative images 502 of sub-segments of segment 3 of "FILE 2" are displayed in the expanded-view window 206. The images 502 may replace the previous images or be inserted between previous images. A sub-segment 502 may be selected for processing by an upward user touch as depicted by arrow 504, or some other user touch action. The sub-segments 502 may be removed, for example, by tapping on the "FILE 2" image 302 in the file-view window 204, and replaced with the segments of "FILE 2". This contracts the view to that shown in FIG. 10. A further tap would remove the displayed segments. This process of expansion and contraction of segments may be continued to display sub-sub-segments, etc. Again, other user touch actions may be used to distinguish between expansion, contraction and selection without departing from the present disclosure.

In this way, a plurality of media files may be rapidly searched and segments (or sub-segments, etc.) within the media files may be selected for processing. Any form of subsequent processing may be applied, including display, playback, editing, transmission to another location or device, storing in memory, etc.

In one illustrative embodiment, the media files contain video content. In a further exemplary embodiment they contain audio content. In a still further illustrative embodiment the media files contain digital images. In this embodiment, the file-view window 204 may display directories of image files, while the expanded-view window 206 displays sub-directories or the individual images, depending on the level of expansion.

Thus, in various exemplary embodiments, the processor is operable to select a media file to be displayed in segments in an expanded-view window in response to a sensed user touch of the representative image of the media file in a file-view window. Further, a segment to be processed is be selected in response to a sensed user touch of the representative image of a segment in the expanded-view window.

The processor is further operable to sense a touch characteristic of a user touch, select the media file to be displayed in the expanded-view window if the touch has a first touch characteristic, and select the complete media file to be processed if the touch has a touch characteristic other than the first touch characteristic.

The touch characteristic may be, for example, a duration of the user touch, a path of the user touch, a direction of the user touch or a number of user touches in a time interval (such as a single tap or double tap).

As described above, the segments of the selected media file may be segments of substantially equal length, identifiably distinct scenes or sections of the selected media file, or some other division of the content.

When representative images of segments of the selected media file are displayed in the expanded-view window, the processor may remove the representative images of segments of the selected media file from the expanded-view window in response to a sensed user touch of the representative image of the media file. In response to a user touch of a representative image of a segment displayed in the expanded-view window, the processor may insert, into the expanded-view window, representative images of sub-segments of the selected segment. The selected segment may be displayed on the touch-sensitive display, transmitted to a remote device, saved to a memory or subject to other processing.

Figure 12:
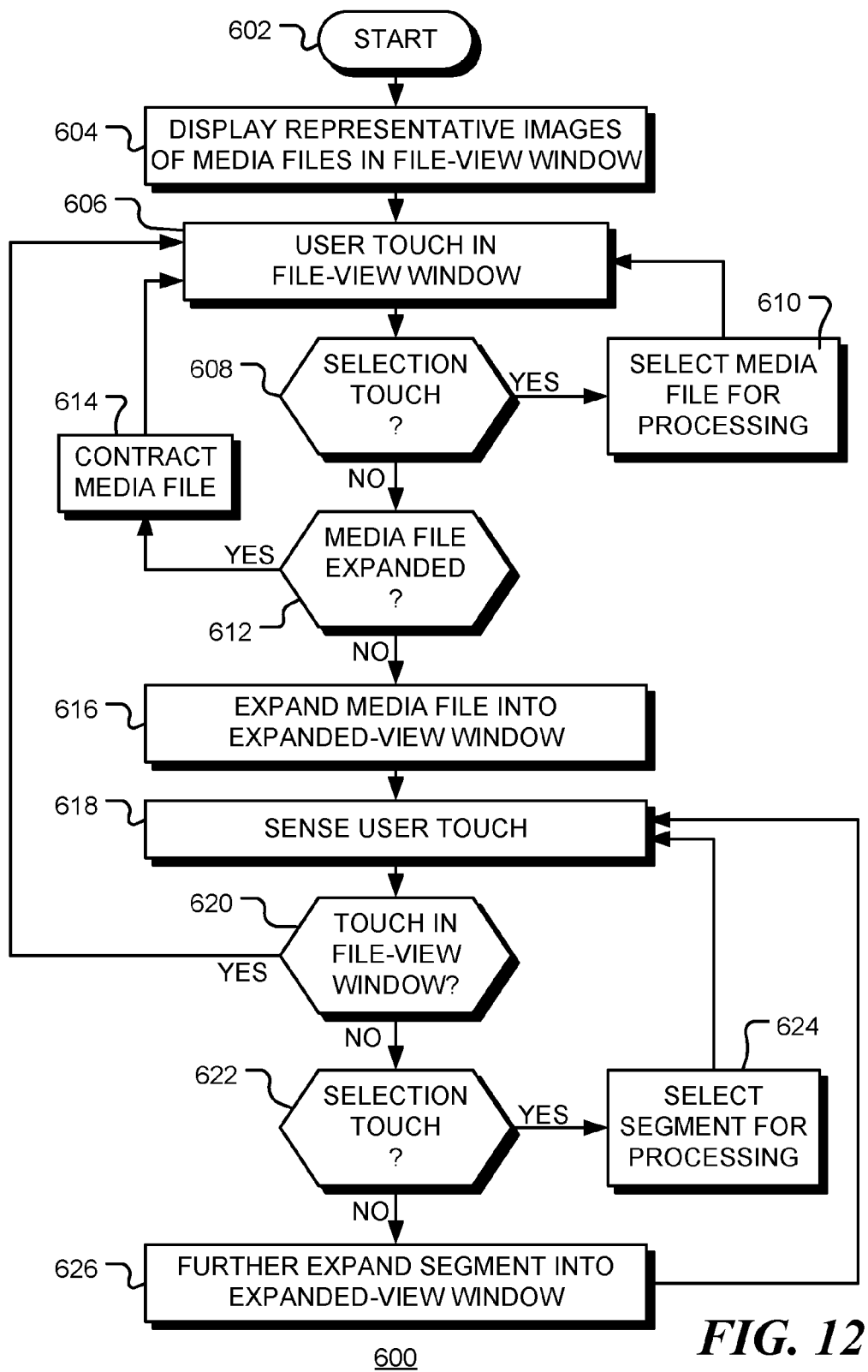
FIG. 12 is a flow chart of a method for selecting a segment of a media file to be processed, in accordance with exemplary embodiments of the disclosure.

FIG. 12 is a flow chart of a method 600 for selecting a segment of a media file to be processed. Following start block 602 in FIG. 12, representative images of a number of media files are displayed in a file-view window of a graphical user interface at block 604. The representative images may be thumbnail images associated with video content or image content, for example. At block 606, a user touch on a representative image in the file-view window is detected. If the touch is identified as being a user touch action associated with selection, as depicted by the positive branch from decision block 608, the media file corresponding to the touched representative image is selected for processing at block 610 and flow returns to block 606 to wait for further user touches in the file-view window. User interaction with other elements of the graphical user interface or other peripheral devices may also be monitored and responded to. If the touch is identified as having a touch characteristic other than that of a selection touch, as depicted by the negative branch from decision block 608, flow continues to decision block 612. If the content of the selected media file has already been expanded into the expand view window, as depicted by the positive branch from decision block 612, the expanded-view is contracted at block 614 and flow returns to block 606. Otherwise, as depicted by the negative branch from decision block 612, the content of the media file is split into a number of segments and a representative image of each segment is displayed in the expanded-view window at block 616. At block 618, a user touch in the file-view window or expanded-view window is detected. If the touch is in the file-view window, as depicted by the positive branch from decision block 620, flow returns to block 606. Otherwise, if the touch is in the expanded-view window, as depicted by the negative branch from decision block 620, flow continues to decision block 622, where the character of the touch is determined. If the touch has the character of a selection touch, as depicted by the positive branch from decision block 622, the touched segment is selected for processing at block 624 and flow continues to block 618. Otherwise, as depicted by the negative branch from decision block 622, the touched segment is expanded again into sub-segments that are displayed in the expanded-view window at block 626. Flow then continues to block 618 to wait for further user input.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An electronic device, comprising:
a display;
a processor coupled to the display;
a memory coupled to and in cooperative arrangement with the processor, the processor and memory configured to:
generate a graphical user interface on the display, the graphical user interface comprising a file-view window configured to display representative images of a plurality of media files;
in direct response to a first user input performed directly on a representative image of a media file of the plurality of media files, without any further user input, expand the media file by:
displaying an expanded-view window within the file-view window on the graphical user interface, the expanded-view window being displayed between the representative image of the media file and one remaining representative image of one remaining media file in the plurality of media files, wherein the one remaining representative image is one of immediately above and immediately below the representative image of the media file; and
rendering, within the expanded-view window, a plurality of representative images of segments of the expanded media file, the first user input comprising an origin point on the representative image;
in direct response to a second user input performed directly on one of the representative images of segments of the expanded media file in the expanded-view window, display in the expanded-view window a plurality of representative images of sub-segments of a segment corresponding to the representative image associated with the second user input, wherein the displaying replaces the representative image with the plurality of representative images of sub-segments and maintains a remaining set of the plurality of representative images of segments within the expanded-view window; and
in direct response to a third user input performed directly on one of a representative image of one of the plurality of representative images of sub-segments and a representative image of the plurality of representative images of segments of the expanded media file displayed in the expanded-view window where the user input comprises an origin point on the representative image of one of the plurality of representative images of sub-segments and the plurality of representative images of segments:
process one of the sub-segment and the segment of the expanded media file associated with the representative image corresponding to the third user input.

2. The apparatus of claim 1, where the processor is further operable to:
sense a characteristic of the first user input on the representative image of the media file.

3. The apparatus of claim 1, where the at least one of displaying an expanded-view window and processing the one of the sub-segment and the segment of the expanded media file is in response to a duration of one of the first user input, the and the third user input, respectively.

4. The apparatus of claim 1, where the at least one of displaying an expanded-view window and processing the one of the sub-segment and the segment of the expanded media file is in response to a path of one of the first user input and the and the third user input, respectively.

5. The apparatus of claim 1, where the segments of the expanded media file comprise segments of substantially equal length.

6. The apparatus of claim 1, where the segments of the expanded media file comprise identifiably distinct sections of the selected media file.

7. The apparatus of claim 1 where, when the plurality of representative images of segments of the expanded media file are displayed in the expanded-view window, the processor is further operable to:
remove the plurality of representative images of segments of the expanded media file from the expanded-view window in response to a sensed user input on the representative image of the media file.

8. The apparatus of claim 1, where the processor is further operable to display the selected segment on the display.

9. The apparatus of claim 1, where the processor is further operable to transmit the one of the sub-segment and the segment to a remote device.

10. The apparatus of claim 1, where the display comprises a touch-sensitive screen and the user input comprises a user touch.

11. A method for selecting a segment of a media file to be processed, comprising:
displaying representative images of a plurality of media files in a file-view window of a graphical user interface displayed on a display;
in direct response to a user input performed directly on a representative image in the file-view window where the user input comprises an origin point on the representative image:
determining a characteristic of the user input; and
when the determined characteristic of the user input is associated with an expansion operation, performing an expansion of a media file associated with the representative image, without requiring any further user input, by:
displaying an expanded-view window within the file-view window on the display, the expanded-view window being displayed between the representative image and one remaining representative image of one remaining media file in the plurality of media files, wherein the one remaining representative image is one of immediately above and immediately below the representative image of the media file; and
displaying, in the expanded-view window of the graphical user interface, representative images of a plurality of segments of media content associated with the expanded media file;
in direct response to a user input performed directly on a representative image of a segment displayed in the expanded-view window, display in the expanded-view window a plurality of representative images of sub-segments of the segment corresponding to the representative image associated with the user input, wherein the displaying replaces the representative image of the segment with the plurality of representative images of sub-segments and maintains a remaining set of the plurality of representative images of segments within the expanded-view window; and
in direct response to a user input performed directly on one of a representative image of one of the plurality of representative images of sub-segments and a representative image of the plurality of representative images of segments of the expanded media file displayed in the expanded-view window where the user input comprises an origin point on the representative image of one of the plurality of representative images of sub-segments and the plurality of representative images of segments: determining a characteristic of the user input; and
when the determined characteristic of the user input is associated with a selection operation:
selecting to be processed media content associated with the representative image associated with the user input.

12. The method of claim 11, further comprising:
responsive to the user input on the representative image in the file-view window:
when the determined characteristic of the user input is associated with a selection operation:
selecting to be processed media content associated with the representative image associated with the user input.

13. The method of claim 11, further comprising:
responsive to the user input on the representative image in the file-view window:
when the determined characteristic of the user input is associated with a contraction operation:
removing, from the expanded-view window, at least one of
the plurality of representative images of sub-segments, and
the plurality of representative images of segments associated with the user input.

14. The method of claim 11, where:
the representative images of the plurality of media files in the file-view window are arranged vertically;
the representative images of the plurality of segments of media content associated with the representative image in the file-view window are arranged horizontally below the representative image of the expanded media file in the file-view window; and
the representative images of the plurality of sub-segments of the segment of media content associated with the representative image are inserted into the expanded-view window, displacing the representative images of the plurality of segments.

15. The method of claim 11, where:
the representative images of the plurality of media files in the file-view window are arranged vertically;
the representative images of the plurality of segments of media content associated with the representative image of the media file in the file-view window are arranged horizontally below the representative image of the expanded media file in the file-view window; and
the representative images of the plurality of sub-segments of the segment of media content associated with the representative image of the expanded segment are inserted into the expanded-view window below the representative image of the expanded segment.

16. The method of claim 11, where a user input, having a characteristic other than the characteristic associated with the selection operation, on a representative image in the file-view window is associated with expansion when corresponding media content is not displayed in the expanded-view window, and is associated with contraction if the corresponding media content is displayed in the expanded-view window.

17. The method of claim 11, where the plurality of segments of the media content comprise segments of substantially equal length.

18. The method of claim 11, where the plurality of segments of the media content comprise segments corresponding to identifiably distinct segments of the media file content.

19. The method of claim 11, further comprising:
sensing a further user input on the representative image of the media file in the file-view window;
determining a characteristic of the further user input;
when the determined characteristic of the further user input is other than the characteristic associated with the selection operation:
removing, from the expanded-view window of the graphical user interface, at least one of
the plurality of representative images of sub-segments, and
the plurality of representative images of segments.

20. The method of claim 11, where the plurality of media files contain video content and where the selected media content is processed to display the video content.

21. The method of claim 11, where:
the representative images of the plurality of media files in the file-view window are arranged vertically; and
the representative images of the plurality of segments of media content associated with the representative image of the media file in the file-view window are arranged horizontally below the representative image of the media file in the file-view window.

22. The method of claim 11, where the characteristic of the user input associated with selection comprises a double tap.

23. The method of claim 11, where the characteristic of the user input associated with selection comprises a touch and hold characteristic.

24. A non-transitory computer-readable medium having computer-executable instructions that, when executed by a processor, cause the processor to perform the method of claim 11.

25. A method for selecting a segment of a media file to be processed, comprising:
displaying a graphical user interface having file-view window on a touch-sensitive display;
displaying representative images of a plurality of media files in the file-view window;
in direct response to a user touch action associated with an expansion operation performed directly on a representative image of a media file in the file-view window where the user touch action comprises an origin point on the representative image, performing an expansion of the media file without requiring an intervening user input by:
displaying an expanded-view window within the file-view window on the touch-sensitive display, the expanded-view window being displayed between the representative image of the media file and one remaining representative image of one remaining media file in the plurality of media files, wherein the one remaining representative image is one of immediately above and immediately below the representative image of the media file; and
displaying, in the expanded-view window of the graphical user interface, representative images of a plurality of segments of media content associated with the touched representative image in the file-view window;
in direct response to a user input performed directly on a representative image of a segment displayed in the expanded-view window, display in the expanded-view window a plurality of representative images of sub-segments of the segment corresponding to the representative image associated with the user input, wherein the displaying replaces the representative image of the segment with the plurality of representative images of sub-segments and maintains a remaining set of the plurality of representative images of segments within the expanded-view window; and in direct response to a user touch action associated with a selection operation performed directly on one of a representative image of one of the plurality of representative images of sub-segments and a representative image of the plurality of representative images of segments of the expanded media file displayed in the expanded-view window where the user input comprises an origin point on the representative image of one of the plurality of representative images of sub-segments and the plurality of representative images of segments:

selecting to be processed one of the sub-segment and the segment of the expanded media file associated with the touched representative image.

26. The method of claim 25, further comprising:
responsive to a user touch action associated with a selection operation on a representative image of the media file displayed in the file-view window:
selecting to be processed media content associated with the touched representative image.

27. The method of claim 25, further comprising:
responsive to a user touch action associated with a contraction operation:
removing the representative images of one of segments and sub-segments of the media content from the expanded-view window of the graphical user interface.

28. The method of claim 25, further comprising:
responsive to a user touch action associated with an expansion operation on a representative image of a segment of media content in the expanded-view window:
displaying, in the expanded-view window of the graphical user interface, representative images of a plurality of sub-segments of the segment of media content associated with the touched representative image.

* * * * *